United States Patent [19]

Koch et al.

[11] Patent Number: 5,331,043

[45] Date of Patent: Jul. 19, 1994

[54] (METH)ACRYLATE RESINS WITH REDUCED YELLOWING, THEIR PRODUCTION AND USE

[75] Inventors: Klaus-Uwe Koch, Hanau; Heidi Mich, Rodgau, both of Fed. Rep. of Germany

[73] Assignee: Degussa Aktiengesellschaft, Frankfurt, Fed. Rep. of Germany

[21] Appl. No.: 2,383

[22] Filed: Jan. 11, 1993

[30] Foreign Application Priority Data

Jan. 9, 1992 [DE] Fed. Rep. of Germany ....... 4200354

[51] Int. Cl.$^5$ .................. C08K 5/17; C08K 5/54; C08K 5/56; C08K 5/36
[52] U.S. Cl. .................. 524/714; 524/730; 524/781; 524/853; 524/742; 526/192; 526/279; 528/31
[58] Field of Search ............ 524/714, 730, 781, 853, 524/742; 526/192, 279; 528/31

[56] References Cited

U.S. PATENT DOCUMENTS

| | | | |
|---|---|---|---|
| 3,453,230 | 7/1969 | Plueddeman | 526/279 |
| 4,286,660 | 11/1988 | Ittman et al. | 524/853 |
| 4,427,034 | 1/1984 | Nagata et al. | 524/714 |

FOREIGN PATENT DOCUMENTS

| | | | |
|---|---|---|---|
| 1186436 | 4/1985 | Canada | 524/730 |
| 0217545 | 8/1986 | European Pat. Off. | |
| 0270709 | 12/1986 | European Pat. Off. | |
| 0039604 | 2/1987 | Japan | 526/192 |

OTHER PUBLICATIONS

European Search Report.
European Office Action.
Chemical Abstracts, vol. 107, No. 22, Nov. 30, 1987.
Chemical Abstracts, vol. 82, No. 10, Mar. 10, 1975.

*Primary Examiner*—Paul R. Michl
*Assistant Examiner*—Peter Szekely
*Attorney, Agent, or Firm*—Cushman, Darby & Cushman

[57] ABSTRACT

A silane-containing methacrylate resin composition which produces non-yellowing polymers. The composition contains 20–99.9% by weight (meth)acrylic acid ester, optionally other comonomers or polymers and softeners as well as 0.1–30% by weight of a silane. 100 parts by weight of this mixture are polymerized in the presence of a free radical initiator, $Cu^{2+}$ and a quaternary amine. The components can be stored in premixtures and brought to reaction. The polymer can be used in glass laminates.

17 Claims, No Drawings

(METH)ACRYLATE RESINS WITH REDUCED YELLOWING, THEIR PRODUCTION AND USE

The present invention relates to silane-containing (meth)acrylate resins and polymerizable mixtures which have improved yellowing properties, to a method of their production and to their use.

BACKGROUND OF THE INVENTION

Pure poly(meth)acrylates have excellent weathering properties. That is, they are stable when exposed to UV radiation or visible light. Yellowing normally is not a problem for these products. On the other hand, the pure homo- and copolymers of methacryic monomers are not suitable for bonding, since they exhibit only very low adhesive properties. Thus, such polymers can be produced between sheets of glass by bulk polymerization and the glass sheets can be separated readily from the polymeric intermediate layer after cooling (see Published European Patent Application EP 0,217,545 B1). On the other hand, if bonding is desired such as, e.g., for the manufacture of laminated glass sheets, an adhesion promoter must be added to the reaction mixture from which the polymer is produced. Silanes are suitable as adhesion promoters, especially when bonding with siliceous materials (e.g. glass sheets) (See Japanese Patent JP 49-80183). These silanes can be polymerized into the polymer chain and bring about very good adhesion promotion, even in relatively low concentrations. On the other hand, however, the silanes also bring about, in combination with other components, a considerable yellowing, which must be reduced by means of suitable selection of the monomers, catalysts, accelerators, inhibitors or by the addition of UV adsorption agents. The subjective appearance of yellowing can also be reduced by means of appropriately colored glass panes. However, the latter methods can not be used in UV-initiated systems because, then, not enough UV light can penetrate into the monomer mixture.

SUMMARY OF THE INVENTION

The object of the present invention is to provide a silane-containing methacrylate resin which has a reduced tendency to yellow as well as a method of producing such a resin.

These and other objects are achieved in a (meth)acrylate-containing, polymerizable mixture which has the following composition:

| | |
|---|---|
| (Meth)acrylate (A) | 20–99.9 parts by weight |
| Comonomers (B) | 0–79.9 parts by weight |
| Soluble polymers in A or B (C) | 0–70 parts by weight |
| sum of A + B + C | 59.9–99.9 by weight |
| Silane | 0.1–30 parts by weight |
| Plasticizer | 0–40 parts by weight |
| the total of A + B + C + Silane + plasticizer being 100 parts by weight and, for each 100 parts by weight of the above-indicated components, | |
| free radical initiators | 0.1–5 parts by weight |
| $Cu^{2+}$ compound | 0.005–10 ppm |
| Organic quaternary ammonium compounds | 0.005–3 parts by weight |

These components can be stored and made available in premixtures. The premixtures can then be intimately mixed at the site where polymerization is to take place, introduced into a prepared mold and polymerized. Such premixtures can contain:

(I) The monomers and optionally dissolved polymers, the plasticizer, copper and optionally the sulfur compound;

And/or (II) the silane, at least a part of the softener, at least part of the quaternary ammonium compound and optionally (contain) the sulfur compound;

And/or (III) the free radical initiator, preferably a peroxy ester, and at least a part of the plasticizer.

It has been found to be especially favorable to use a content of 60–99.75% by weight of the (meth)acrylate component (A). Preferably 0.1–10% by weight and especially preferably 0.2–4% by weight of the silane component is used.

It was found that, in the case of the (meth)acrylic acid esters (A), the alcohol component can be selected practically without limitation. Thus, e.g. aliphatic, aromatic, polyvalent, oligomeric, polymeric and functionalized alcohols are possible. No example was found in which the alcohol component adversely affected the result.

The following are especially suitable as the (meth)acrylate containing component A: Methylmethacrylate, 2-ethylhexyl (meth) acrylate, ethylmethacrylate, n-butyl methacrylate, isobutyl methacrylate, hydroxyethyl(meth)acrylate, hydroxypropyl(meth)acrylate, n-hexylmethacrylate, cyclohexylmethacrylate, 2-phenylethylmethacrylate, ethyltriglycolmethacrylate, butyl(meth)acrylate. The monomer mixture customarily contains up to 10% by weight, preferably 0.5 to 5% by weight and especially 1 to 2% by weight of cross-linking agents such as e.g. triethylene glycol dimethacrylate, allylmethacrylate, ethylene glycol dimethacrylate, diethylene glycol dimethacrylate, triethylene glycol dimethacrylate, tetraethylene glycol dimethacrylate, polyethylene glycol dimethacrylate, 1,3-butane diol dimethacrylate, 1,4-butane diol dimethacrylate, 1,6-butane diol dimethacrylate, 1,12 dodecane diol dimethacrylate, bisphenol-A-dimethacrylate, diurethane dimethacrylate, trimethylolpropane trimethacrylate, N,N-methylene bismethacrylamide, 1,6-hexane diol diacrylate, divinyl benzene, triallyl cyanurate, di-allyl phthalate, neopentylglycol dimethacrylate. Especially the A-component can also contain a prepolymer as soluble polymer. The polymer can be dissolved as such in the monomer, or it can be obtained by partial polymerization of the monomer. Prepolymers of (meth)acrylates, especially of methylmethacrylate are preferred.

Suitable comonomers are e.g. styrene, acrylonitrile, acrylamide, methacrylamide, methacrylic acid and acrylic acid. Comonomers serve to modify the mechanical properties of the resin, e.g. to increase the stiffness. Basically, copolymers do not disturb the result of the invention. The comonomer content is usually below 50% by weight, preferably below 40% by weight and especially 0 to 5% by weight. It is preferred that there be no comonomer.

Plasticizers are usually added in order to increase the flexibility of the polymerizates. The following are especially suitable: Dimethylphthalate, diethylphthalate, dipropylphthalate, dibutyl phthalate, diisobutyl phthalate, butyl benzylphthalate, dipentylphthalate, dihexylphthalate, diisoheptylphthalate, di(2-ethylhexyl)phthalate, diisooctylphthalate, di-n-octylphthalate, triethylcitrate, tri-n-butyl citrate, acetyltriethylcitrate, acetyltri-n-butyl citrate (ATBC), acetyltri-2-hexylcitrate, acetyl-tri-n-hexylcitrate, acetyltri-n-(hexyl-octyldecyl)citrate, acetyltri-n-(octyl)citrate.

Peroxides and, with particular advantage, peroxy esters such as e.g. tert. butyl perbenzoate (TBPB), tert. butyl per-2-ethylhexanoate can be used as free radical initiators.

Copper-containing organic compounds are used as $Cu^{2+}$, especially those which are soluble in the monomers. E.g. copper naphthenate, copper acetyl acetonate are suitable. The $Cu^{2+}$ functions as an accelerator.

It was found that, in silane-containing systems in which basic ammonium compounds are used, aside from the quaternary ammonium compounds, all other such basic ammonium compounds result in a distinct yellowing. The invention therefore includes the use of quaternary ammonium compounds in (meth)acrylate-containing and silane-containing, polymerizable mixtures in order to reduce the tendency to yellow of the resulting resin. The quaternary ammonium compound to be used in accordance with the invention is preferably aliphatic but can also contain one or several aromatic groups, among which in particular benzyl groups are suitable. It is preferable if at the most one aromatic or benzyl group is in the quaternary ammonium compound. If the aryl group is more than one carbon atom distant from the nitrogen atom, the resin again displays a distinct yellowing, which, however, can still be tolerated in comparison to the yellowing observed when tertiary ammonium compounds are used. The quaternary ammonium compound customarily has 4–45 carbon atoms, those with 8-38 carbon atoms are especially preferred and in particular those with more than 12 carbon atoms. Each group in the quaternary ammonium compound pound has preferably 1-25 carbon atoms, preferably 1-20 carbon atoms and advantageously 1-15 carbon atoms, especially 1-12 carbon atoms. Halogens or pseudo-halogens, especially chlorine, are suitable as anion. E.g. trioctylmethyl ammonium chloride (TOMA) and tetradecylbenzyldimethyl ammonium chloride (TdBDMA) are especially suitable. The type and size of the individual groups on the nitrogen atom have only a subordinate significance as long as an effective amount of the quaternary ammonium compound is soluble in the mixture to be polymerized. One group is customarily a lower alkyl group, especially methyl, since such quaternary ammonium compounds are especially readily available.

The following are suitable examples of silanes: 3-methacryloxypropyltrimethoxy silane (MPTS) and also 3-mercaptopropyltrimethoxy silane, vinyltriacetoxy silane, vinyltriethoxy silane and vinyltrimethoxy silane. The silanes preferably enter into the polymerization in and can then also be used in rather large amounts. Silanes which can become linked reactively to the polymer are also advantageous; they can then also function simultaneously as regulators for the chain length. Too small amounts of silane no longer meet their purpose of use and result e.g. in a poorer bonding with silicaeous materials.

Sulfur compounds are added as chain regulators such as those customarily used in free radical polymerization.

In particular, glycol dimercaptoacetate (GDMA), thioglycolic acid, dodecylmercaptane, mercaptosuccinic acid and thioglycolic acid isooctoate are suitable.

The resulting polymer is preferably clearly transparent so that it can be used in composite panels. However, translucent, e.g. opaque adjustments are also suitable to this end, so that milky white compounds can also be produced as well as clear, transparent (glass) panels. The opaque adjustment is obtained e.g. by means of polymers which are soluble in A or B and incompatible with the polymerized matrix or by means of incompatible polymers produced in situ. The base units of these polymerizates can be of a varied nature, in particular polymethacrylates and copolymerizates therewith, as well as polystyrene and its copolymerizates.

For the method of producing the (meth) acrylate resins, the individual components or premixtures enumerated above are intimately mixed with each other and usually exposed to a temperature of 15°-80° C. Temperatures between 20° and 30° C. are preferred. The polymerization takes place as a rule in bulk and is advantageously initiated by mixing together the initially described premixtures.

The invention also provides the correspondingly produced resins, which are used in particular in multiply panels.

DETAILED DESCRIPTION OF PREFERRED EMBODIMENTS

The invention is explained in more detail in the following examples in which compound glass panes constituting the main area of application of the present invention are manufactured and then evaluated for their tendency to yellow.

EXAMPLES 1 TO 14

The monomers and optional softener (I) are intimately mixed with each other in a glass container with agitation at room temperature. Polymethylmethacrylate (PMMA) is dissolved for several hours at 40° C. in methylmethacrylate.

1 part peroxide (50% in plasticizer), 0.15 parts copper naphthenate (1% solution in 2-ethylhexylmethacrylate), about 1.5 ppm $Cu^{2+}$ and 2 parts of a mixture of amine, silane and softener are added to 100 parts of this mixture with agitation.

The thoroughly mixed reaction mixture is poured between two cleaned glass sheets (soda-lime glass) with the dimensions 300 mm × 300 mm × 1.5 mm whose edge is sealed by a butyl rubber sealing strip. The polymerization takes place with the sheets in a horizontal position at room temperature. Two laminated glass sheets are produced from each example.

Each of the laminated glass sheets obtained is stored for three days at 60° C. and 80° C., respectively. Then the b value (absolute value of the yellowing) of the laminated glass sheets is tested in a spectrophotometric device of the firm Pier-Electronic GmbH, a double-ray photometer. The Δ b value indicates the increase in yellowing caused by storage for three days at the elevated temperature.

The results are given in the table. It can be clearly seen that tertiary amines result in a distinct yellowing. Even phenylalkyls with more than one carbon atom in the alkyl group contribute somewhat to the yellowing.

TABLE

| Methyl methacrylate | Ethylhexyl acrylate | Triethyleneglycol di-methacrylate | Acetyltributyl citrate | LP Polymethyl methacrylate |
| --- | --- | --- | --- | --- |

TABLE-continued

| Example | (parts) | (parts) | (parts) | (parts) | (parts) |
|---|---|---|---|---|---|
| 1 | 50 | 48 | 2 | — | — |
| 2* | 50 | 48 | 2 | — | — |
| 3 | 50 | 48 | 2 | — | — |
| 4* | 50 | 48 | 2 | — | — |
| 5 | 45 | 43 | 2 | 10 | — |
| 6 | 45 | 38 | 2 | 15 | — |
| 7 | 40 | 38 | 2 | 20 | — |
| 8 | 72 | — | 1 | — | 27 |
| 9* | 72 | — | 1 | — | 27 |
| 10 | 72 | — | 1 | — | 27 |
| 11 | 72 | — | 1 | — | 27 |
| 12 | 72 | — | 1 | — | 27 |
| 13[6)] | 62 | — | 1 | — | 27 |
| 14 | | | | | |

| Example | TBPB | ATBC | MPTS | β-Benzyl amine[1)] | β-Amine[2)] | TOMA | TOA[3)] | TPA[4)] | TdBDMA | $Cu^{2+}$ [5)] |
|---|---|---|---|---|---|---|---|---|---|---|
| 1 | 0.5 | 1.440 | 1 | 0.06 | — | — | — | — | — | 0.15 |
| 2* | 0.5 | 1.450 | 1 | — | 0.05 | — | — | — | — | 0.15 |
| 3 | 0.5 | 1.440 | 1 | — | — | 0.06 | — | — | — | 0.15 |
| 4* | 0.5 | 1.425 | 1 | — | — | — | 0.075 | — | — | 0.15 |
| 5 | 0.5 | 1.440 | 1 | — | — | 0.06 | — | — | — | 0.15 |
| 6 | 0.5 | 1.440 | 1 | — | — | 0.06 | — | — | — | 0.15 |
| 7 | 0.5 | 1.440 | 1 | — | — | 0.06 | — | — | — | 0.15 |
| 8 | 0.5 | 1.440 | 1 | — | — | 0.06 | — | — | — | 0.15 |
| 9* | 0.5 | 1.440 | 1 | — | — | — | — | 0.04 | — | 0.15 |
| 10 | 0.5 | 1.440 | 1 | — | — | — | — | — | 0.06 | 0.15 |
| 11 | 0.5 | 1.440 | 1[7)] | — | — | 0.06 | — | — | — | 0.15 |
| 12 | 0.5 | 1.440 | 1[8)] | — | — | 0.06 | — | — | — | 0.15 |
| 13 | 0.5 | 1.440 | 1[9)] | — | — | 0.06 | — | — | — | 0.15 |
| 14 | | | | | | | | | | |

All data is in parts by weight.
The data of the partial amounts refer in each instance to 100 parts by weight monomer mixture or syrup.
*Reference example
[1)] β-phenylethylbenzyldibutyl ammonium chloride
[2)] β-phenylethyldibutyl ammonium hydrochloride
[3)] Trioctyl ammonium hydrochloride
[4)] Tripentyl ammonium hydrochloride
[5)] As copper naphthenate (10% $Cu^{2+}$) 1% in 2-ethylhexyl methacrylate
[6)] also contains 10 parts styrene
[7)] contains mercaptopropyltrimethoxy silane instead of MPTS
[8)] contains 3-chloropropyltrimethoxy silane instead of MPTS
[9)] contains mercaptopropyltrimethoxy silane and vinyltriacetoxy silane (1:1 w/w) instead of MPTS

| Example | b-value after 3 days at +60° C. | | b-value after 3 days at +80° C. | |
|---|---|---|---|---|
| 1 | 1.15 | Δ b + 0.29 | 1.96 | Δ b + 1.08 |
| 2 | 4.07 | Δ b + 2.89 | 9.21 | Δ b + 7.95 |
| 3 | 0.86 | Δ b + 0.16 | 1.20 | Δ b + 0.47 |
| 4 | 2.29 | Δ b + 1.48 | 6.39 | Δ b + 5.53 |
| 5 | 0.79 | Δ b + 0.13 | 0.95 | Δ b + 0.29 |
| 6 | 0.78 | Δ b + 0.09 | 1.01 | Δ b + 0.29 |
| 7 | 0.93 | Δ b + 0.21 | 1.10 | Δ b + 0.36 |
| 8 | 1.59 | Δ b + 0.71 | 1.17 | Δ b + 0.40 |
| 9 | 3.04 | Δ b + 2.32 | 9.66 | Δ b + 8.88 |
| 10 | 0.84 | Δ b + 0.14 | 0.94 | Δ b + 0.23 |
| 11 | 1.03 | Δ b + 0.17 | 1.10 | Δ b + 0.24 |
| 12 | 0.89 | Δ b + 0.16 | 1.37 | Δ b + 0.64 |
| 13 | 1.14 | Δ b + 0.21 | not measured | |
| 14 | | | | |

What is claimed is:

1. A (meth)acrylate-containing, polymerizable mixture containing:

| | |
|---|---|
| (Meth)acrylate (A) | 20–99.9 parts by weight |
| Comonomers (B) | 0–79.9 parts by weight |
| Soluble polymers in A or B (C) | 0–70 parts by weight |
| sum of A + B + C | 59.9–99.9 parts by weight |
| Silane | 0.1–30 parts by weight |
| Plasticizer | 0–40 parts by weight | the total of A + B + C + Silane + plasticizer being 100 parts by weight and, for each 100 parts by weight of the above-indicated components,

| | |
|---|---|
| free radical initiators | 0.1–5 parts by weight |
| organic $Cu^{2+}$ compound | 0.005–10 ppm |
| Organic quaternary ammonium compounds | 0.005–3 parts by weight |
| Organic sulfur-containing chain regulator compounds | 0–5 parts by weight. |

2. A polymerizable mixture as set forth in claim 1 in which the amount of comonomer is 0–5% by weight.

3. A polymerizable mixture as set forth in claim 1 in which the free radical initiator is a peroxy ester.

4. The polymerizable mixture as set forth in claim 1 in which the quaternary ammonium compound contains at least one member of the group consisting of aliphatic groups and benzyl groups.

5. The polymerizable mixture as set forth in claim 1 in which the quaternary ammonium compound is a halide.

6. A polymerizable mixture as set forth in claim 1 in which the quaternary ammonium compound contains 4–45 carbon atoms.

7. A polymerizable mixture according to claim 6 in which each group in the quaternary ammonium compound contains 1–25 carbon atoms.

8. A polymerizable mixture as set forth in claim 1 which is transparent, translucent or opaque.

9. A method of producing a (meth)acrylic resin which comprises polymerizing a mixture as set forth in claim 1.

10. A method as set forth in claim 9 which is carried out by bulk polymerization.

11. A method as set forth in claim 9 in which the polymerization is carried out at a temperature of 15°–80° C.

12. A method as set forth in claim 9 in which compounds A, B and C, the plasticizer and the organic $Cu^{2+}$ compound are premixed.

13. A method as set forth in claim 12 in which the premixture also contains dissolved polymers and the sulfur compound.

14. A method as set forth in claim 9 in which the silane, at least a part of the plasticizer and the quaternary ammonium compound are premixed.

15. A method as set forth in claim 14 in which the premixture also contains the sulfur compound 16. A method as set forth in claim 9 in which the free radical initiator and at least a part of the plasticizer are premixed and the initiator is a peroxy ester.

17. A polymer produced by the method of claim 9.

* * * * *